(12) United States Patent
Ho

(10) Patent No.: US 7,044,702 B2
(45) Date of Patent: May 16, 2006

(54) SCREW WITH A PLURALITY OF SCREWING ANGLES AND MOLD DEVICE FOR FORMING THE SAME

(76) Inventor: Jen-Tong Ho, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/762,139

(22) Filed: Jan. 22, 2004

(65) Prior Publication Data

US 2005/0163596 A1    Jul. 28, 2005

(51) Int. Cl.
*F16B 35/04*    (2006.01)
*F16B 39/30*    (2006.01)

(52) U.S. Cl. .................. 411/411; 411/412; 411/413; 411/415; 411/307; 411/308

(58) Field of Classification Search .......... 411/411, 411/412, 413, 415, 307, 308, 309
See application file for complete search history.

(56) References Cited

U.S. PATENT DOCUMENTS

| | | | |
|---|---|---|---|
| 3,682,507 A * | 8/1972 | Waud | 411/413 |
| 3,799,229 A * | 3/1974 | Johnson | 411/307 |
| 3,966,341 A * | 6/1976 | Bailey et al. | 403/343 |
| 4,778,319 A * | 10/1988 | Schule | 411/387.4 |
| 4,844,676 A * | 7/1989 | Adamek | 411/386 |
| 4,874,278 A * | 10/1989 | Kawashita | 411/386 |
| 4,878,793 A * | 11/1989 | Hewison | 411/387.2 |
| 5,015,134 A * | 5/1991 | Gotoh | 411/386 |
| 5,259,398 A * | 11/1993 | Vrespa | 128/898 |
| 5,433,570 A * | 7/1995 | Koppel | 411/392 |
| 5,735,653 A * | 4/1998 | Schiefer et al. | 411/82 |
| 5,882,162 A * | 3/1999 | Kaneko | 411/411 |
| 6,000,892 A * | 12/1999 | Takasaki | 411/413 |
| 6,030,162 A * | 2/2000 | Huebner | 411/413 |
| 6,319,254 B1 * | 11/2001 | Giet et al. | 606/73 |
| 2003/0059277 A1 * | 3/2003 | O'Berry | 411/413 |

\* cited by examiner

*Primary Examiner*—Robert J. Sandy
*Assistant Examiner*—David Reese

(57) ABSTRACT

The screw with a plurality of helix angles comprises a first section having a first thread with a first helix angle, at least one third section having a third thread with a third helix angle; and a fifth section having a fifth thread with a fifth helix angle wherein the fifth thread is identical to the first thread. The third helix angle is equal or not equal to the first helix angle. Moreover, the screw further comprises a second section connected between the first section and the third section; the second section having a second thread with a second helix angle; a fourth section connected between the third section and the fifth section; and the fourth section having a fourth thread with a fourth helix angle. A mold device for forming the screw is also included. The mold device further comprises a second mold line-symmetrical to the first mold.

2 Claims, 12 Drawing Sheets

SCREW WITH A PLURALITY OF SCREWING ANGLES AND MOLD DEVICE FOR FORMING THE SAME

FIELD OF THE INVENTION

The present invention relates to screws, and particular to a screw with a plurality of helix angles and a mold device for forming the screw.

BACKGROUND OF THE INVENTION

The prior art screw has a thread with unique orientation. With reference to FIG. 12, an operation for screwing a prior art screw is illustrated. It is illustrated that the screw is screwed into a work piece with a constant orientation. This results in that the screw is tightly clamped by the work piece so that the friction force is larger and thus the screwing work is difficult. When the screw is longer, the difficulty in locking the screw is enhanced.

SUMMARY OF THE INVENTION

Accordingly, the primary object of the present invention is to provide a screw with a plurality of helix angles which comprises a first section having a first thread with a first helix angle, at least one third section having a third thread with a third screwing angle; and a fifth section having a fifth thread with a fifth helix angle. The third helix angle is equal or not equal to the first helix angle. Moreover, the screw further comprises a second section connected between the first section and the third section; the second section having a second thread with a second helix angle; a fourth section connected between the third section and the fifth section; and the fourth section having a fourth thread with a fourth helix angle. A mold device for forming the screw is also included.

The various objects and advantages of the present invention will be more readily understood from the following detailed description when read in conjunction with the submitted drawings.

DETAILED DESCRIPTION OF THE INVENTION

In order that those skilled in the art can further understand the present invention, a description is provided in the following detail. However, these descriptions and drawings are only used to cause those skilled in the art to understand the objects, features, and characteristics of the present invention, but not to be used to confine the scope and spirit of the present invention defined in the appended claims.

The present invention will be described here.

Figure 1:
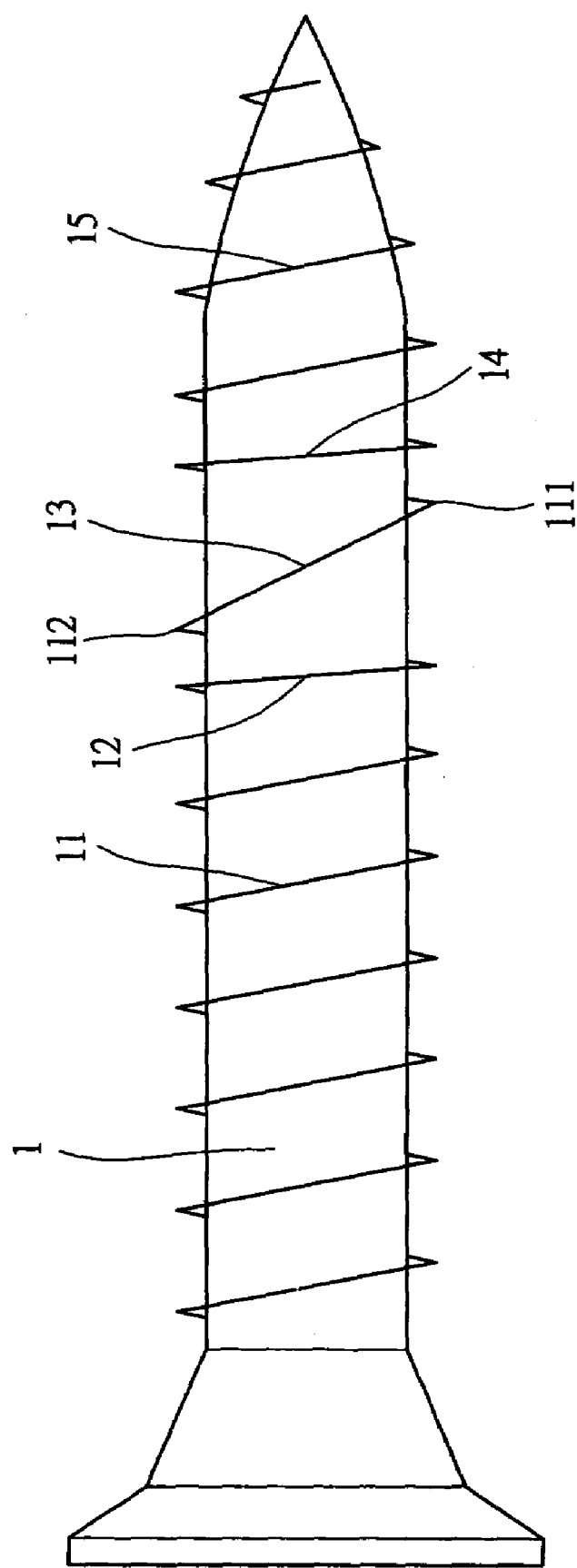
FIG. 1 is a plan schematic view of the screw of the present invention.
Figure 2:
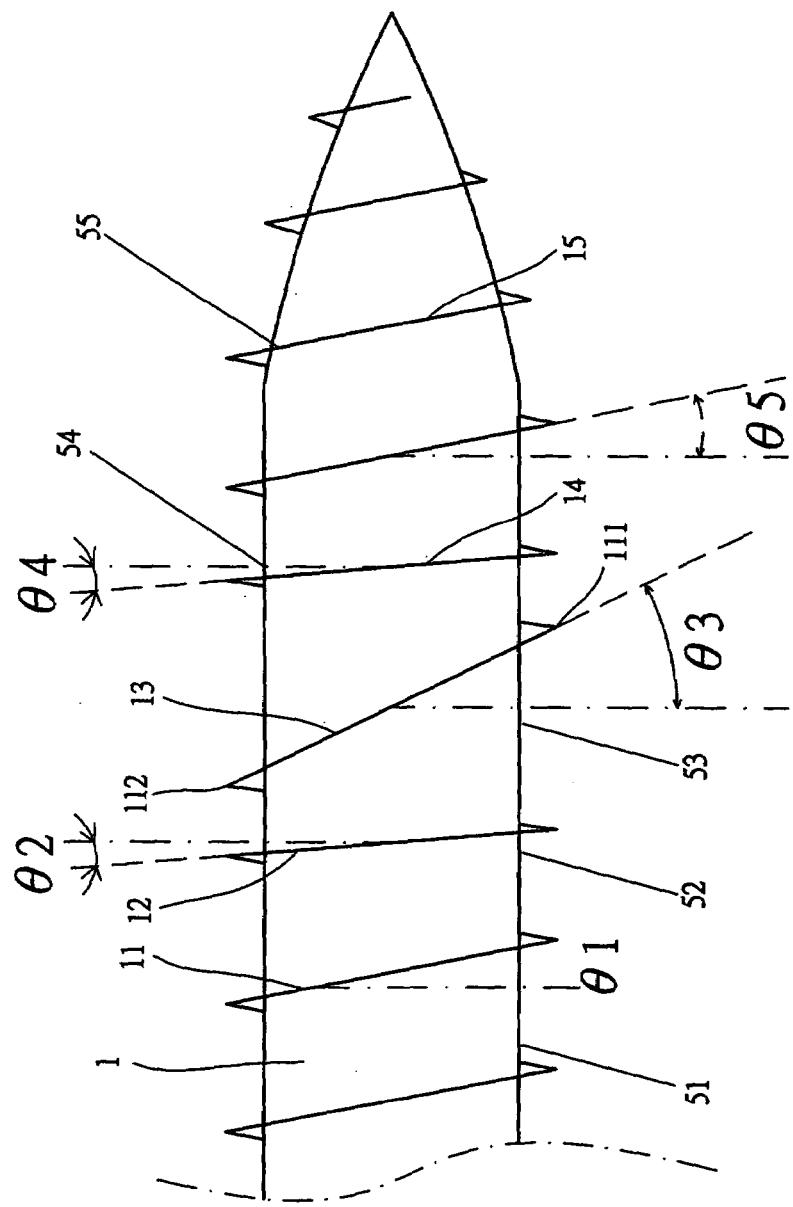
FIG. 2 is a schematic view showing that the first helix angle is greater than the second helix angle according to the present invention.
Figure 3:
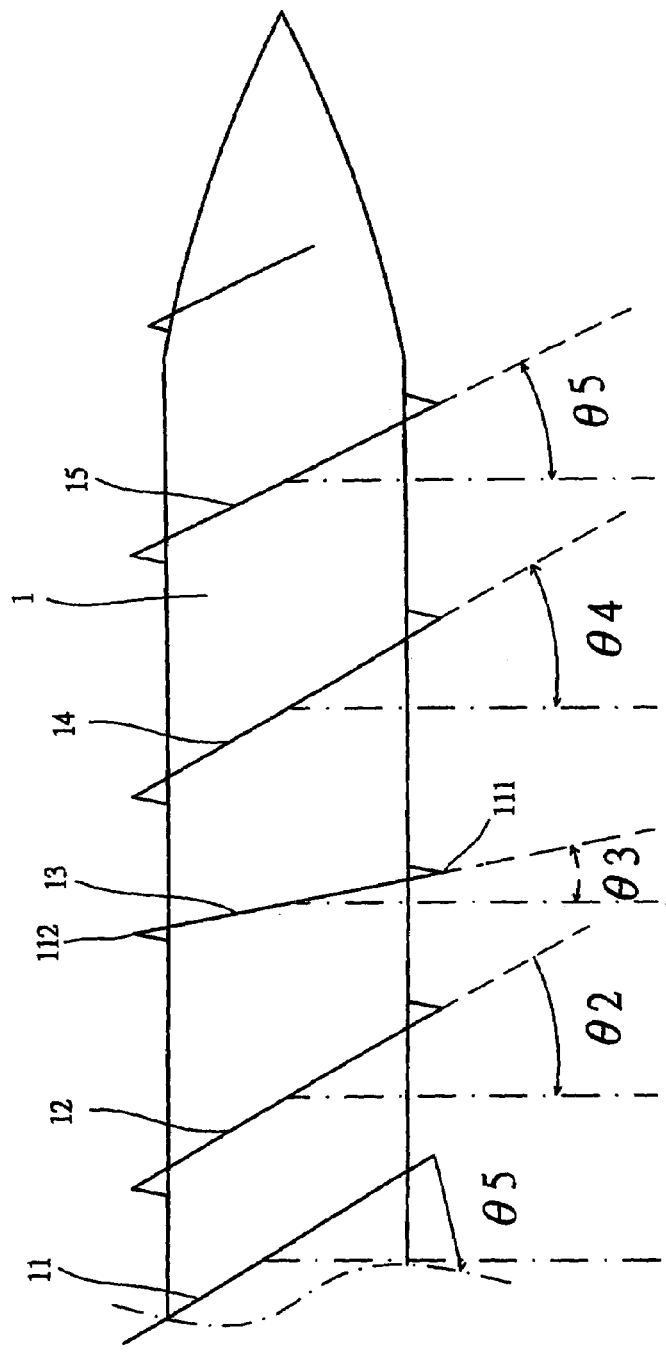
FIG. 3 is a schematic view showing that the first helix angle is smaller than the second helix angle according to the present invention.

With reference to FIGS. 1 to 3, the screw 1 of the present invention includes a first section 51 having a first thread 11 with a first helix angle $\theta 1$, and at least one third section 53 having a third thread 13 with a third helix angle $\theta 3$ and a fifth section 55 having a fifth thread 15 with a fifth helix angle $\theta 5$ which is identical to that in the first section 1. Indeed, the fifth thread 15 is identical the first thread 11, namely, they have the same thread pitch and helix angle. The third helix angle $\theta 3$ is not equal to the first helix angle $\theta 1$. Preferably, the third helix angle $\theta 3$ is greater than the first helix angle $\theta 1$ or the third helix angle $\theta 3$ is smaller than the first helix angle $\theta 1$.

A second section 52 is connected between the first section 51 and the third section 53. The second section 52 has a second thread 12 with a second helix angle $\theta 2$. A fourth section 54 is connected between the third section 53 and the fifth section 55. The fourth section 54 has a fourth thread 14 with a fourth helix angle $\theta 4$. The fourth helix angle $\theta 4$ is smaller than the first helix angle $\theta 1$ and/or the second helix angle $\theta 2$ is smaller than the first helix angle $\theta 1$.

The thread pitch of the third thread 13 is 150 to 170% of the thread pitch of the first thread 11, and the thread pitch of the fourth thread 14 and/or the second thread 12 is 67 to 75% of that of the first thread 11.

In a further embodiment, the thread the pitch of the third thread 13 is 30 to 50% of the first thread 11; and the thread pitch of the fourth thread 14 and/or second thread 12 is 125 to 135% of that of the first thread 11.

The fourth helix angle $\theta 4$ is equal or unequal to the second helix angle $\theta 2$.

Figure 4:
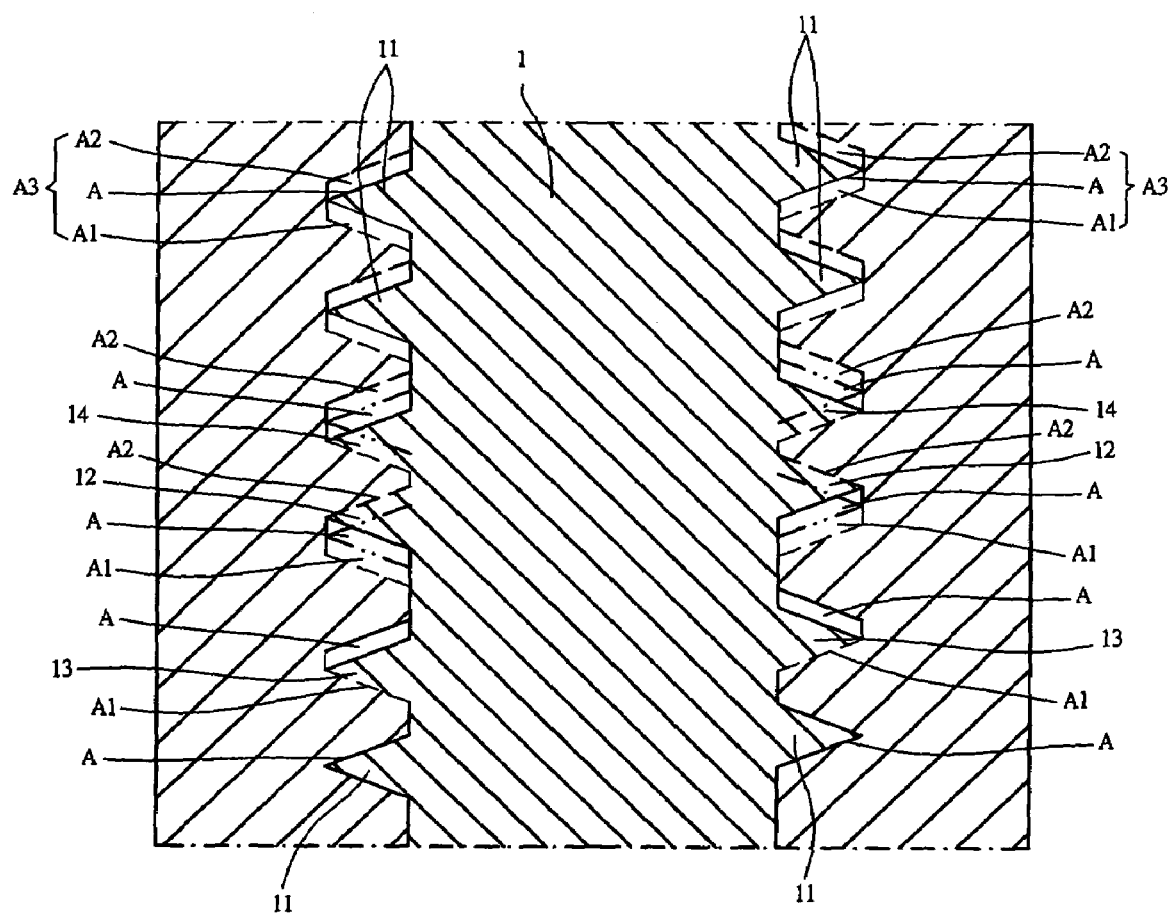
FIG. 4 is a cross section view showing that a screw is screwed into a work piece according to the present invention.

Referring to FIG. 4, the operation of the present invention will be described here. In screwing the screw 1, the fifth section 55 firstly moves into the work piece with the fifth thread 15 identical to the first thread 11 serves to cut into the work piece, where the indication A in FIG. 4 is a cut screw channel. When the fourth section 54 having the fourth thread 14 enters into the work piece, the channel A will be enlarged at one side so as to be formed with an enlarged portion A1 due to the fourth helix angle $\theta 4$ of the fourth thread 14 different from the first helix angle $\theta 1$ as the dashed line shown in FIG. 4. When the screw 1 enters into the work piece continuously, due to the third helix angle $\theta 3$ of the third thread 13, the channel A is further enlarged at another side so as to be formed with another enlarged portion A2. Next, the second thread 12 enters into the work piece. The channel is further enlarged to have a proper width as the indication A2 shown in FIG. 4. Thereby, when the first section 51 of the screw with the first thread 11 further enters into the work piece, since the channel is enlarged, the screw can enter into the work piece with less friction. This is especially beneficial for long screws.

The test result of the present invention with the prior art screw will be described herein.

The test object: CHIB wood screw.

Specification: Major diameter/depth of the thread/pitch: 4.0/50/1.8

Number of test object: 10, the average value is calculated.

Figure 5:
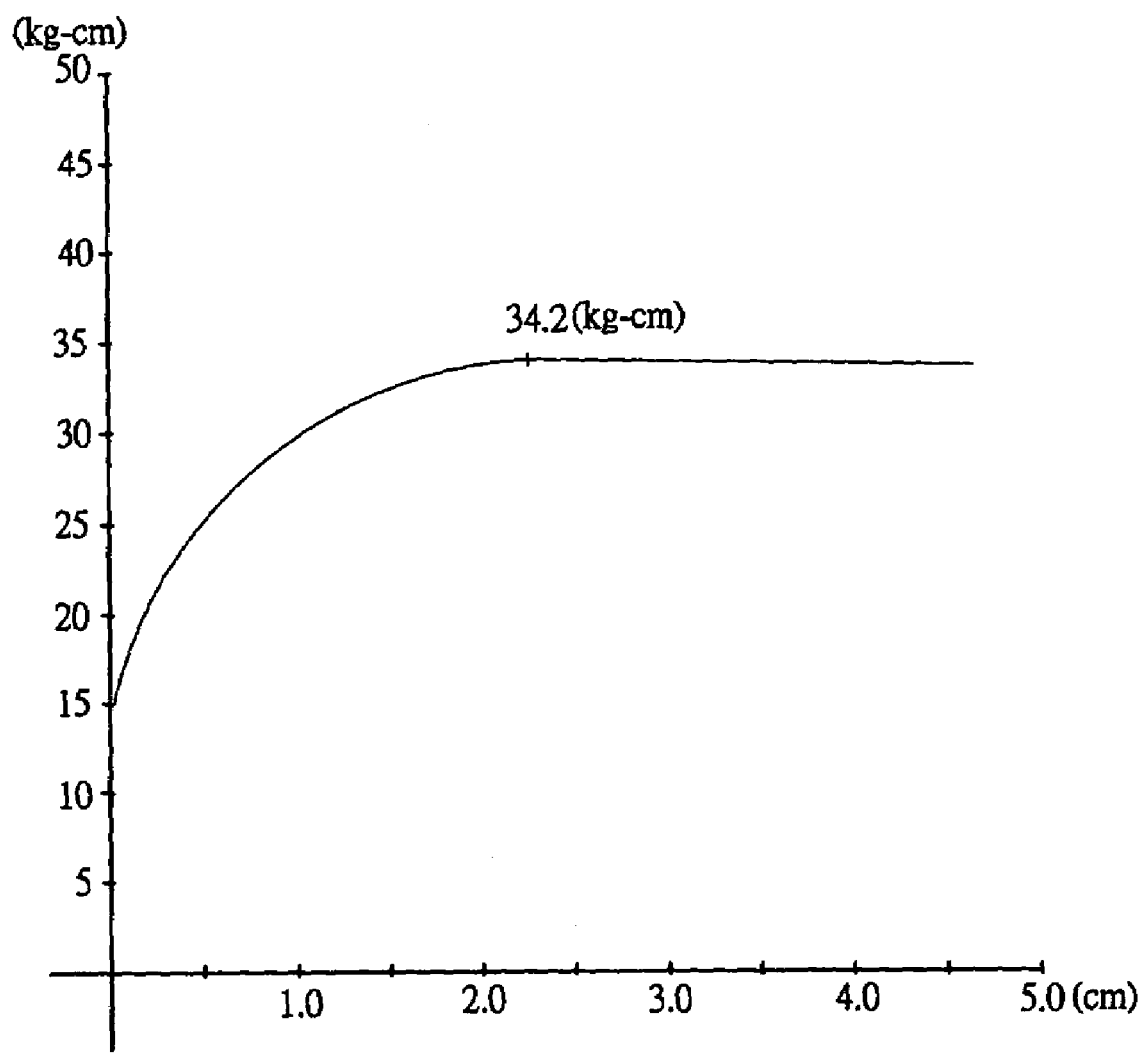
FIG. 5 is a schematic view showing the curves in the twisting test according to the present invention.
Figure 6:
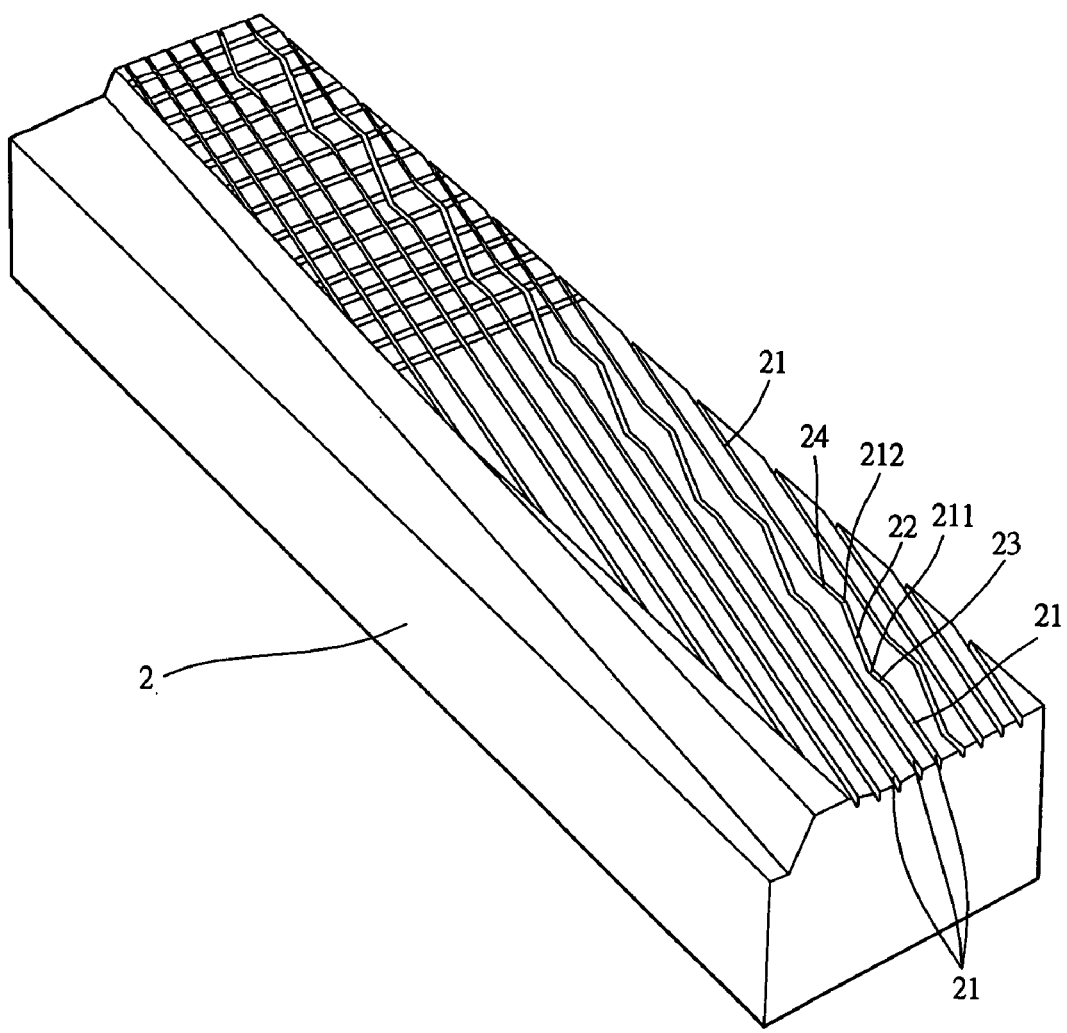
FIG. 6 is a schematic perspective view of the mold device of the present invention.

Referring to FIG. 5, the test result is illustrated. It is illustrated the larger twisting force of the screw of the present invention is at a point of about 2.0 to 2.5 cm with an average twisting force of 34.2 kg/cm. Then, after the portion of the screw after that point, the twisting force is normal. This means that when a long screw is used, less power is necessary. The required twisting force will not increase due to the increment of length of the screw.

Figure 11:
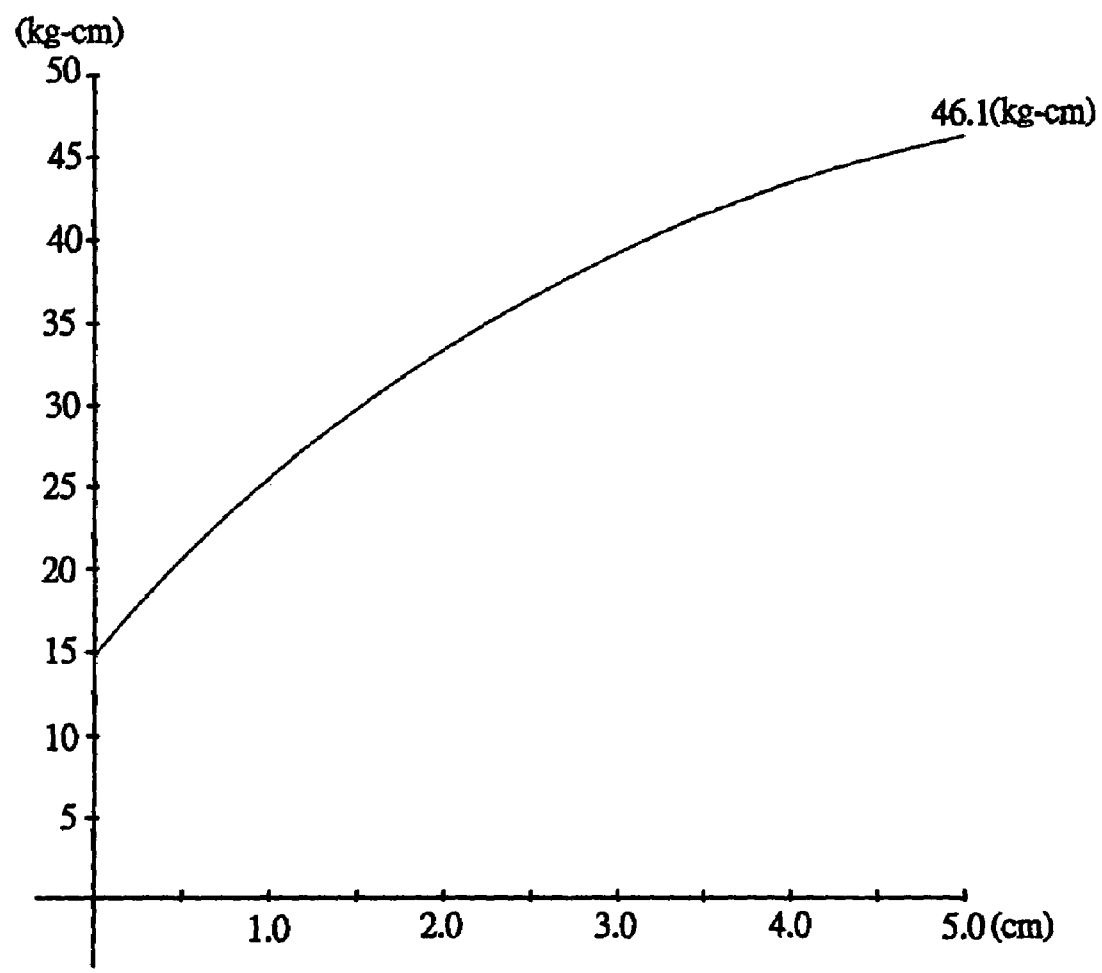
FIG. 11 is a schematic view showing the curves about the twisting test of the prior art.
Figure 12:
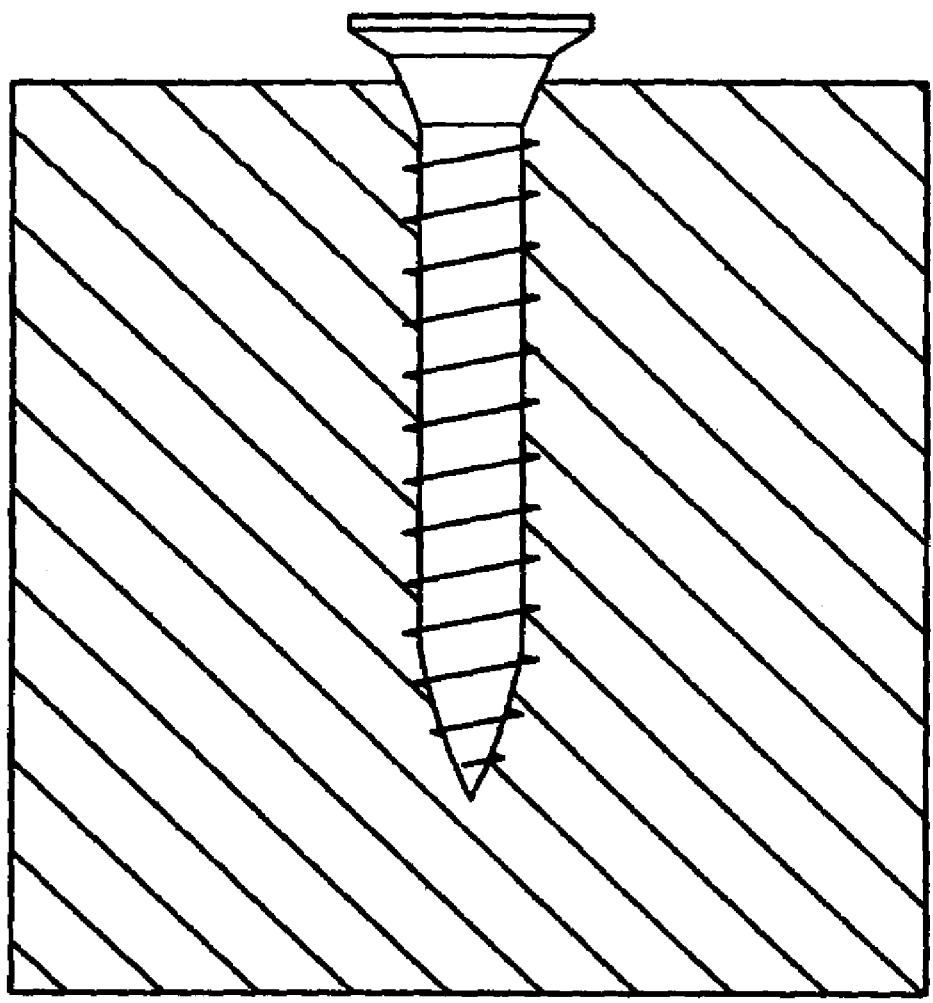
FIG. 12 is a schematic cross view about the operation of the prior art screw.

Referring to FIG. 11, it is illustrated that the average value for the prior art screw is 46.1/kg/cm. The longer the screw, the larger the twisting force. Thus it is difficult to lock a long screw.

Thereby, it is known from above test result, as comparing with a screw of 5 cm, the present invention can save a force of 25% than the prior art. The longer the screw, the greater the force to be saved.

With reference to FIGS. 6 to 10, the mold for forming the screw 1 of the present invention will be described herein. A mold 2 for forming a screw with a plurality of screw angles comprises a first mold which has a plurality of recesses 61 (see FIG. 8) approximately arranged in parallel. Each recess 61 includes two first sloped recesses 21 for forming the first thread 11 with a first helix angle θ1 and a second sloped recess 22 for forming the second thread 12 with the second helix angle θ2. The second sloped recess 22 is connected between the two first sloped recesses 21. The orientation of the second sloped recess 22 is different from that of the first sloped recesses 21.

Figure 7:
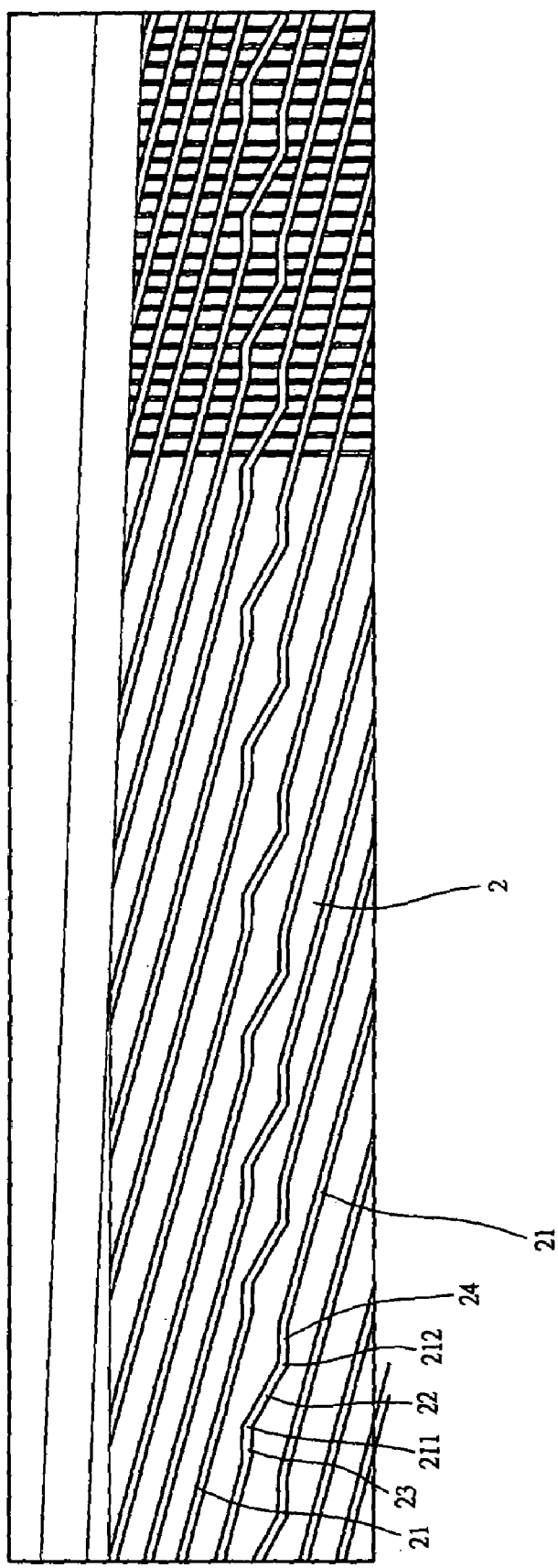
FIG. 7 is a plan schematic view of the mold device of the present invention.
Figure 9:
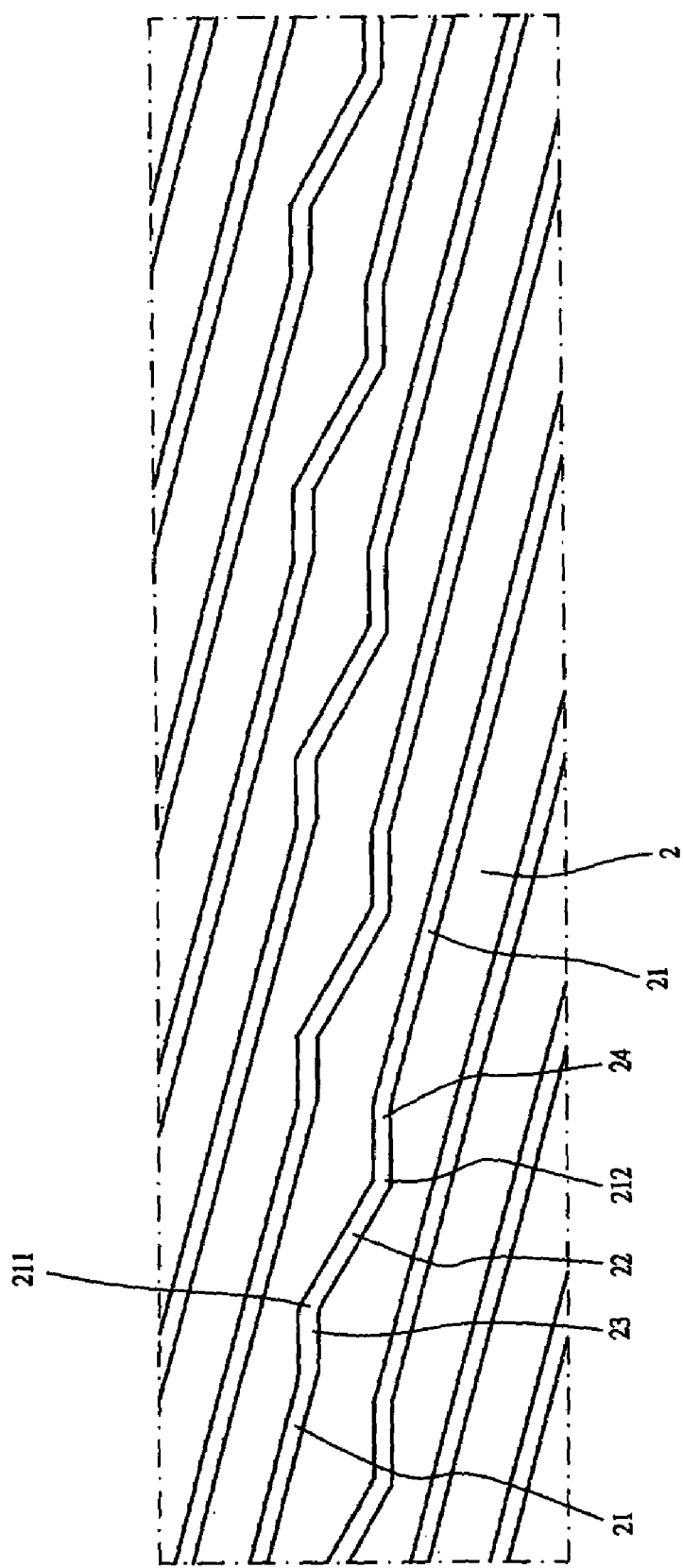
FIG. 9 is a schematic view showing that the orientation of the first sloped recess is greater than that of the second sloped recess according to the present invention.
Figure 10:
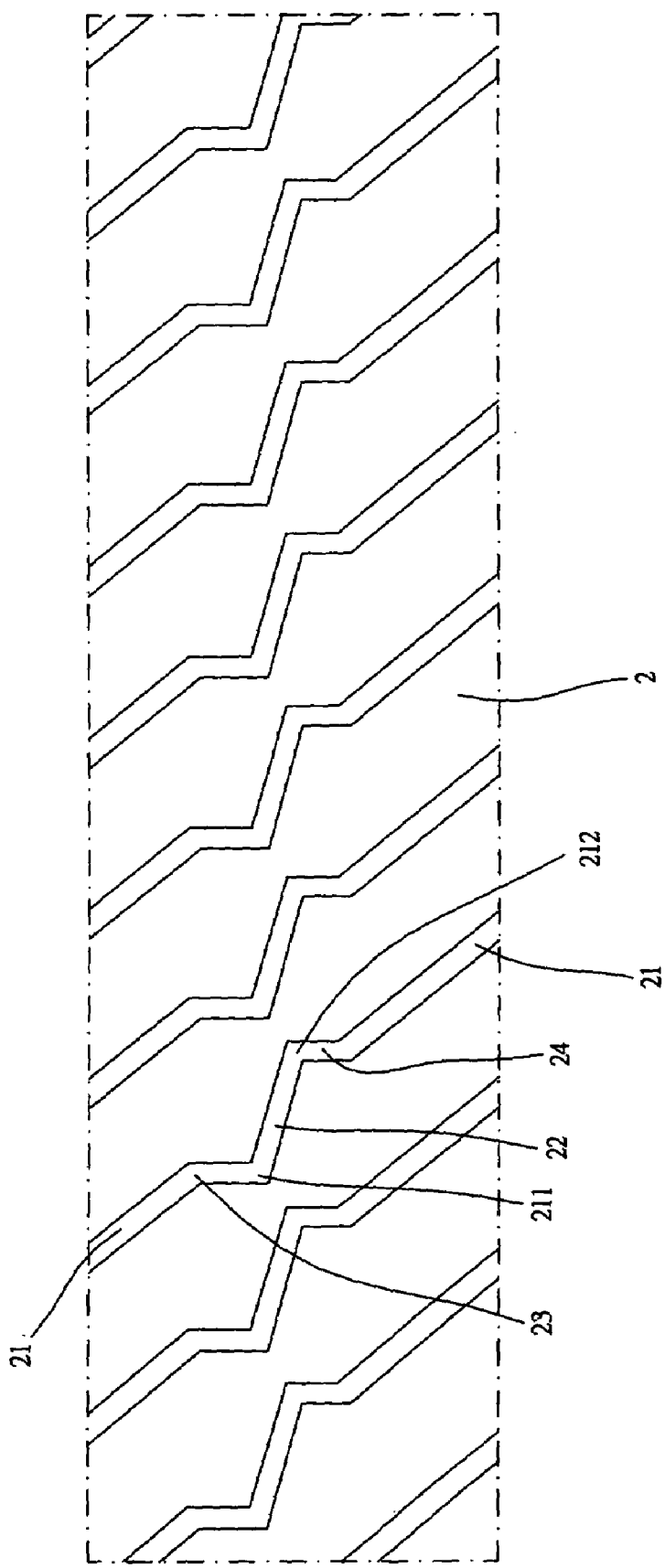
FIG. 10 is a schematic view showing that the orientation of the first sloped recess is smaller than that of the second sloped recess according to the present invention.

With reference to FIGS. 7, 9, and 10, the first mold further includes a third sloped recess 23 connected between one of the first sloped recess 21 and the second sloped recess 22 so as to be as an input end and a fourth sloped trench 24 connected between the other one of the first sloped recess 21 and the second sloped recess 22 so as to be as an output end.

The orientations of the third sloped recess 23 and the fourth sloped trench 24 may be identical or different. Preferably, when the orientation first sloped recess 21 is set as a horizontal direction, the absolute value of the slope of the third sloped recess 23 is identical to or different from the slope of the fourth sloped trench 24.

In the present invention, the slope of the orientation of the second sloped recess 22 is larger than that of the first sloped recess 21, as shown in FIG. 9 or the slope of the orientation of the second sloped recess 22 is smaller than that of the first sloped recess 21, as shown in FIG. 10.

Figure 8:
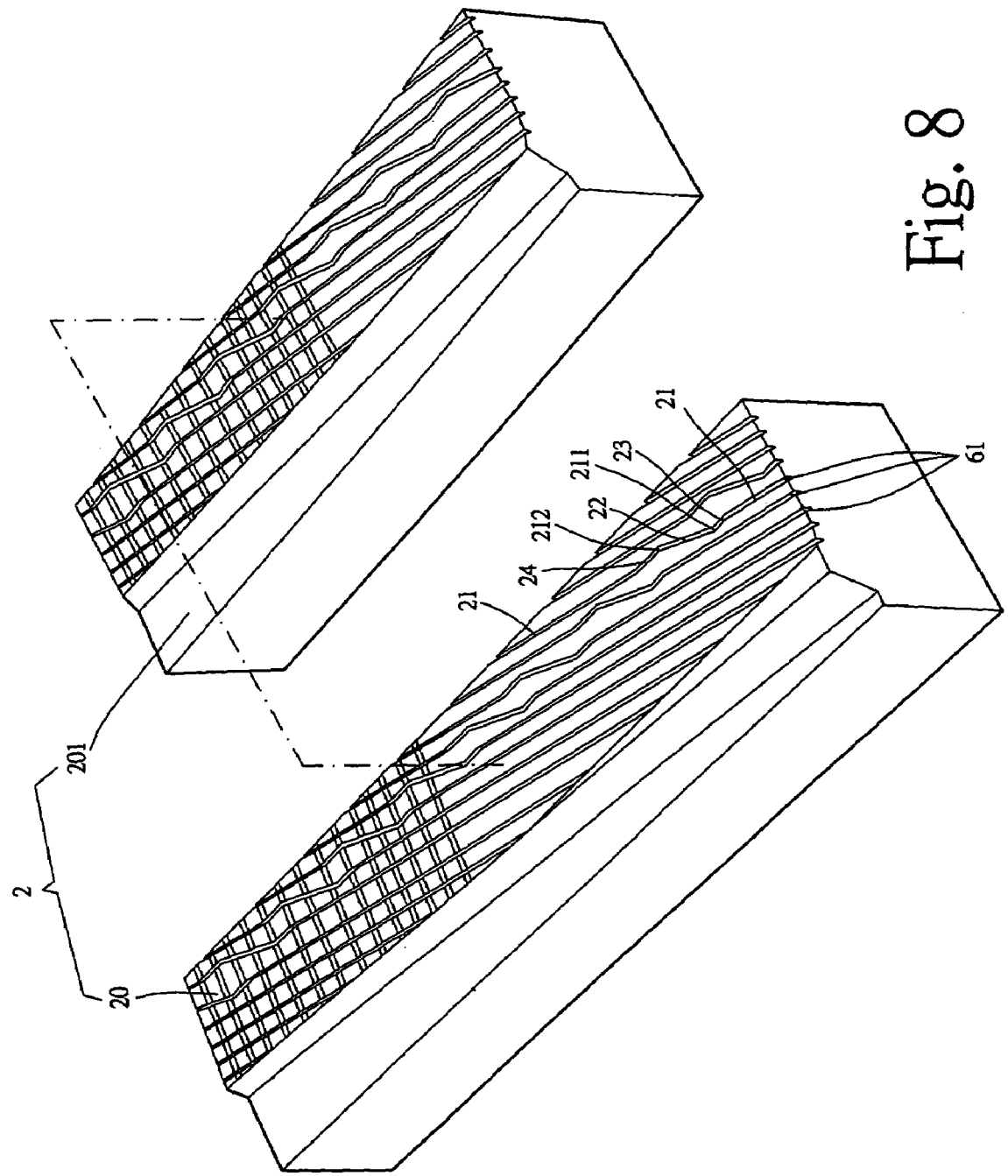
FIG. 8 is a schematic perspective view of a two mold case of the present invention.

Moreover, the mold 2 further comprises a second mold 201. The second mold is symmetrical to the first mold, as shown in FIG. 8.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A screw having a single continuous thread with a plurality of helix angles comprising:
    a first section having a first helix angle,
    at least one third section having a third helix angle; and
    a fifth section having a fifth helix angle; the fifth helix angle being the same as the first helix angle;
    wherein the third helix angle is not equal to the first and fifth helix angle;
    wherein a second section is located between the first section and the third section; the second section having a second helix angle; and
    wherein a fourth section is located between the third section and the fifth section, the fourth section having a fourth helix angle; and
    wherein the third helix angle is 150% to 170% of the first and fifth helix angles, and the helix angles of both the fourth and second sections is 67% to 75% of that of the first and fifth sections.

2. A screw having a single continuous thread with a plurality of helix angles comprising:
    a first section having a first helix angle,
    at least one third section having a third helix angle; and
    a fifth section having a fifth helix angle; the fifth helix angle being the same as the first helix angle;
    wherein the third helix angle is not equal to the first and fifth helix angle;
    wherein a second section is located between the first section and the third section; the second section having a second helix angle; and
    wherein a fourth section is located between the third section and the fifth section, the fourth section having a fourth helix angle; and
    wherein the third helix angle is 30% to 50% of the first and fifth helix angles, and the helix angles of both the fourth and second sections is 125% to 135% of that of the first and fifth sections.

* * * * *